Dec. 11, 1934.  H. D. HELLMERS  1,984,342
PURIFICATION OF SODIUM CARBONATE
Filed May 17, 1933
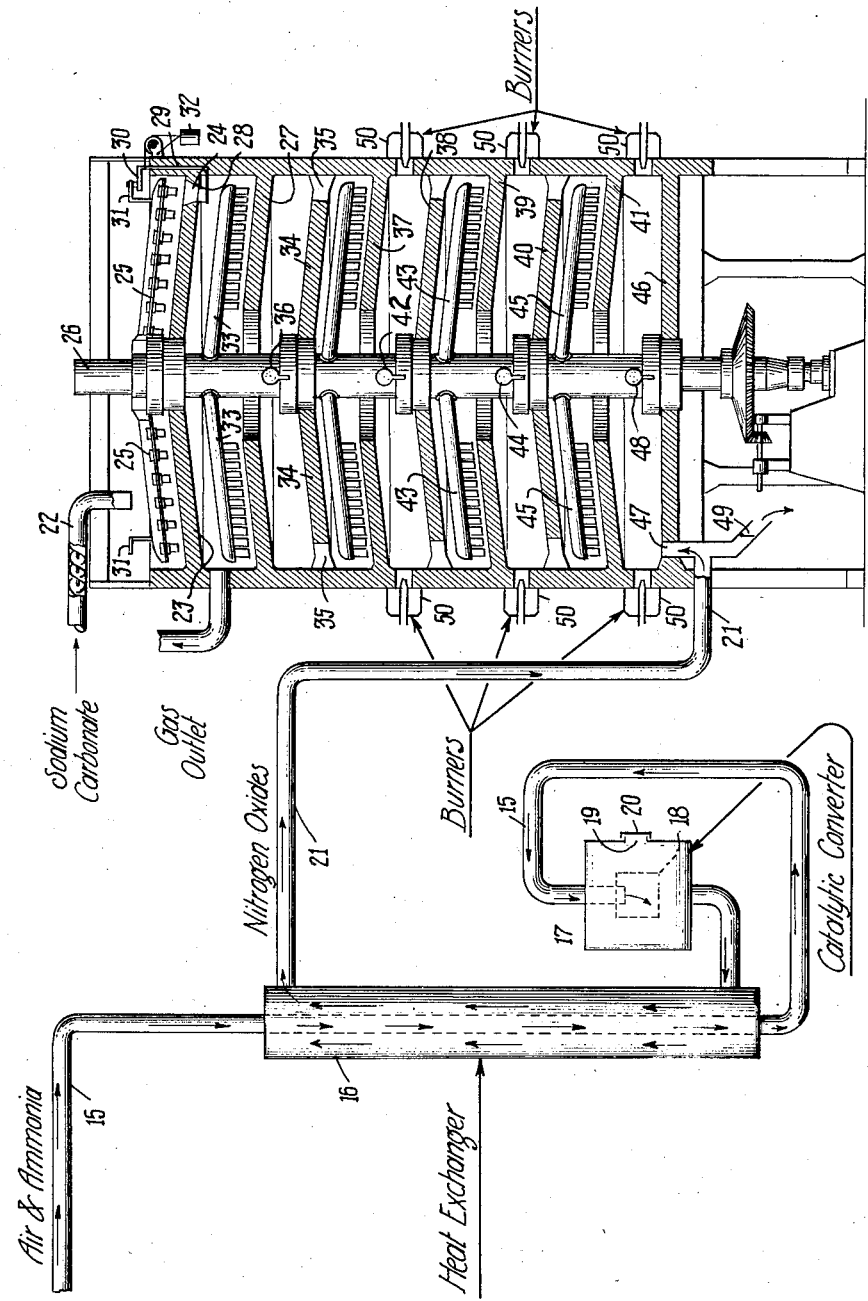
INVENTOR
Henry D. Hellmers
BY
Cooper, Kerr & Dunham
ATTORNEYS Patented Dec. 11, 1934

1,984,342

UNITED STATES PATENT OFFICE 1,984,342

PURIFICATION OF SODIUM CARBONATE

Henry D. Hellmers, Westend, Calif., assignor to West End Chemical Company, Oakland, Calif., a corporation of California Application May 17, 1933, Serial No. 671,523

4 Claims. (Cl. 23—63)

This invention relates to treatment of sodium carbonate for the removal of carbonaceous impurities by oxidation thereof, and its chief object is to provide for the purpose an efficient and economical process which can be carried on continuously. Another object is to provide a process in which no solid residue or reaction product is formed, all the products of the purifying operation or reaction being gaseous. To these and other ends the invention comprises the novel features hereinafter described.

In carrying out the invention I use an oxidizing gas as the purifying agent, preferably nitrogen oxide produced continuously by the oxidation of ammonia, as for example by the well known method in which ammonia and air are passed over a platinum catalyzer. The resulting gases are delivered to the lower end of an upright reaction chamber or furnace, say one of the widely used Nichols-Herreshoff type. Such furnace, equipped with gas burners or other heating means at or near the bottom, is provided with a series of inclined hearths, extending alternately inward from the wall of the furnace toward the center and outwardly from the center toward the furnace wall, thus causing the nitrogen oxides, introduced at the bottom, to flow radially outward and inward, alternately, to the exit opening at the top, where the sodium carbonate is introduced. The carbonate, delivered continuously in fine granular form upon the uppermost hearth, is slowly agitated and fed to the edge thereof by rabbles carried by a central revolving shaft, and drops down upon the next hearth, from which it is similarly agitated and passed on to the next hearth, and so on, cascading thus to the carbonate outlet at the bottom of the furnace. As the carbonate descends it is gradually heated and meets the hot countercurrent gases, which pass over the agitated carbonate and through the carbonate cascading in the form of a rather thin stream or curtain from one hearth to the next below. The gases are thus brought into intimate contact with the carbonate particles and are caused to react with the carbonaceous matters which are intermingled with or carried by the same. The products of the reaction are all gaseous, consisting chiefly if not entirely of carbon dioxide and free nitrogen, which pass out at the top of the furnace. The oxidizing reaction takes place readily at a temperature of 800° to 900° F., and temperatures within that range are preferred.

The accompanying drawing shows in section, somewhat diagrammatically, a convenient and suitable apparatus for practicing my process.

In the apparatus illustrated, a mixture of ammonia gas and air passes by way of pipe 15 through a heat exchanger 16 to the converter 17 where it passes through a platinum gauze catalyzer 18 and is therefore oxidized. From the converter the hot nitrogen oxides go to the heat exchanger, where they give up heat to warm the mixed ammonia and air flowing down therethrough. To initiate the oxidation a blow-torch may be introduced through the opening 19 in the converter wall, provided with a removable closure 20, to heat the platinum gauze, after which the reaction of the gases, preheated in the heat exchanger, proceeds without further external heat. From the heat exchanger the nitrogen oxides pass through pipe 21 into the bottom of the sodium carbonate furnace, to which the dry impure carbonate in fine granular form is delivered by a conveyor 22, falling thence upon the top hearth 23. On the latter the carbonate is raked and gradually moved to the outlet 24 by the rabble arms 25 on the central vertical shaft 26. The carbonate is discharged periodically upon the next lower hearth 27 by a swinging gate or valve 28 on the lower end of a shaft 29 equipped at the top with an operating arm 30 which is actuated periodically by fingers 31 on the rabbles 25. The valve or gate is restored to closed position by a weight 32 after the rabble has passed. On the hearth 27 the carbonate is stirred and raked to the central opening by the rabbles 33, and falls to the next lower hearth 34 where it is stirred and raked to the side openings 35 by similar rabbles 36; and so on down, then passed over the successive hearths 37, 38, 39, 40, 41, by the rabbles 42, 43, 44, 45. On the bottom hearth 46 the carbonate is stirred and raked to the outlet chute 47 by the rabbles 48 and is discharged periodically by a swinging gravity-gate 49 into a suitable receptacle or conveyor, not shown. Openings are provided in the wall of the furnace for the heating burners, indicated at 50, supplied with fuel and air in any convenient way, not shown. By adjustment of the fuel and air supply to the burners the temperature in the furnace can be regulated to gradually heat the carbonate to the reaction temperature in its passage to the lower part of the furnace, where the oxidation of the carbonaceous impurities in the carbonate takes place.

The relatively cool nitrogen oxides supplied by pipe 21 are introduced into the furnace by way of the carbonate outlet chute 49 and are heated as they pass through the reaction zone. At the same time the impure carbonate is descending and is gradually heated to the reaction temperature. The waste gases are discharged through the gas outlet 51.

The process has the advantage of being not only effective but also economical. For instance, a carbonate obtained from the waters of California lakes and having a yellowish or grayish tinge, can be converted into a pure white product with the consumption of only about one-tenth of a pound of ammonia (calculated as $NH_3$) per ton of carbonate. And since the oxidizing reagent and the oxidation products are gaseous there is no resulting contamination of the sodium carbonate.

It is to be understood that the invention is not limited to specific procedure herein described but can be carried out in other ways without departure from its spirit as defined by the appended claims.

I claim—

1. The process of treating dry impure sodium carbonate to remove carbonaceous impurities, comprising heating the impure carbonate in dry finely granular form and passing gaseous nitrogen oxide into intimate contact with the heated carbonate, whereby said carbonaceous impurities are oxidized to gaseous form.

2. The process of treating dry impure sodium carbonate to remove carbonaceous impurities, comprising passing gaseous nitrogen oxide into intimate contact with the carbonate in finely granular form at a temperature of 800° to 900° F., whereby said carbonaceous impurities are oxidized to gaseous form.

3. The continuous process of treating impure sodium carbonate to remove carbonaceous impurities by oxidation thereof to gaseous form, comprising continuously passing impure sodium carbonate in dry finely granular form through a heated reaction zone and agitating the same in its passage therethrough, and continuously passing gaseous nitrogen oxides into intimate contact with the carbonate in the reaction zone to react with said carbonaceous impurities.

4. The continuous process of treating impure sodium carbonate to remove carbonaceous impurities by oxidation to gaseous form, comprising continuously passing dry impure sodium carbonate in finely granular form through a heated reaction zone and agitating it in its travel therethrough, continuously passing nitrogen oxide into intimate contact with the carbonate in the reaction zone to oxidize the carbonaceous impurities, and continuously passing the gaseous oxidation products in contact with the impure carbonate to heat the same.

HENRY D. HELLMERS.